(12) United States Patent
Courbon

(10) Patent No.: US 8,336,845 B1
(45) Date of Patent: Dec. 25, 2012

(54) PIVOTING DETENT JOINT FOR A VEHICLE MIRROR ASSEMBLY

(75) Inventor: Emmanuel Courbon, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 13/182,290

(22) Filed: Jul. 13, 2011

(51) Int. Cl.
  *A47G 1/24* (2006.01)
  *B60R 1/02* (2006.01)
  *G02B 5/08* (2006.01)
  *G02B 7/18* (2006.01)
  *G02B 7/182* (2006.01)

(52) U.S. Cl. .......................... 248/479; 359/841; 359/872

(58) Field of Classification Search .................. 248/466, 248/476, 477, 478, 479, 484; 359/841, 877, 359/871, 872
See application file for complete search history.

(56) References Cited

U.S. PATENT DOCUMENTS

| | | | | |
|---|---|---|---|---|
| 4,186,905 | A | * | 2/1980 | Brudy ........................... 248/478 |
| 4,789,232 | A | * | 12/1988 | Urbanek ....................... 248/549 |
| 4,854,539 | A | | 8/1989 | Glue |
| 5,636,071 | A | * | 6/1997 | Mochizuki et al. ........... 359/877 |
| 5,949,591 | A | | 9/1999 | Whitehead |
| 6,092,778 | A | * | 7/2000 | Lang et al. .................... 248/478 |
| 6,130,514 | A | * | 10/2000 | Oesterholt et al. ............ 318/438 |
| 6,170,957 | B1 | | 1/2001 | Kaspar |
| 6,286,968 | B1 | * | 9/2001 | Sailer et al. ................... 359/872 |
| 6,322,221 | B1 | * | 11/2001 | van de Loo ................... 359/841 |
| 6,352,231 | B1 | | 3/2002 | Lang et al. |
| 6,439,730 | B1 | | 8/2002 | Foote et al. |
| 6,547,308 | B2 | | 4/2003 | Hamelink et al. |
| 6,672,726 | B1 | | 1/2004 | Boddy et al. |
| 6,886,874 | B2 | | 5/2005 | Abe |
| 7,008,067 | B2 | * | 3/2006 | Hsu ............................... 359/841 |
| 7,137,715 | B2 | | 11/2006 | Schuurmans et al. |
| 7,152,986 | B2 | | 12/2006 | Schuurmans |
| 7,172,298 | B2 | | 2/2007 | Olijnyk et al. |
| 7,303,295 | B1 | | 12/2007 | Press |
| 7,314,285 | B2 | * | 1/2008 | Ruse et al. .................... 359/841 |
| 7,350,931 | B1 | | 4/2008 | Peterson et al. |
| 7,354,165 | B1 | | 4/2008 | Ruse et al. |
| 7,374,299 | B2 | * | 5/2008 | Brouwer et al. .............. 359/841 |
| 7,390,102 | B2 | | 6/2008 | Fimeri et al. |
| 7,393,111 | B2 | | 7/2008 | Fuchs et al. |

(Continued)

FOREIGN PATENT DOCUMENTS

DE  4140957 A1 * 6/1992

(Continued)

*Primary Examiner* — Jonathan Liu
*Assistant Examiner* — Guang Guan
(74) *Attorney, Agent, or Firm* — McNair Law Firm, P.A.; Seann P. Lahey

(57) ABSTRACT

A support arm carried by a carrier base. A base tooth ring on the carrier base and an arm tooth ring on the support arm, wherein the arm tooth ring releasably interlocks with the base tooth ring. A base column having a hollow interior chamber carried by the carrier base, and an arm column carried by the support arm extending into the hollow interior chamber. A first stop block channel disposed in a bottom surface of the base column, and a second stop block channel disposed in the support arm adjacent an exterior side of the arm column. A first stop block carried by a distal end of the base column received into the second stop block channel, and a second stop block carried by a distal end of the arm column being received into the first stop block channel to define a range of pivotal movement.

17 Claims, 8 Drawing Sheets

U.S. PATENT DOCUMENTS

| | | | |
|---|---|---|---|
| 7,448,762 B2 * | 11/2008 | Su | 359/841 |
| 7,452,088 B2 | 11/2008 | Brester et al. | |
| 7,490,945 B2 * | 2/2009 | Proctor | 359/841 |
| 7,490,946 B1 | 2/2009 | Foote et al. | |
| 7,547,855 B2 * | 6/2009 | Brouwer et al. | 200/405 |
| 7,631,977 B2 | 12/2009 | Lang et al. | |
| 7,686,274 B2 * | 3/2010 | Branham | 248/477 |
| 7,815,324 B2 * | 10/2010 | Sakata | 359/841 |
| 8,152,124 B2 * | 4/2012 | Branham | 248/475.1 |
| 2005/0052764 A1 | 3/2005 | Centmayer et al. | |
| 2009/0166505 A1 * | 7/2009 | Courbon | 248/478 |

FOREIGN PATENT DOCUMENTS

| | | | |
|---|---|---|---|
| EP | 881124 A2 * | 12/1998 | |
| JP | 10059069 A * | 3/1998 | |
| JP | 10297372 A * | 11/1998 | |

* cited by examiner

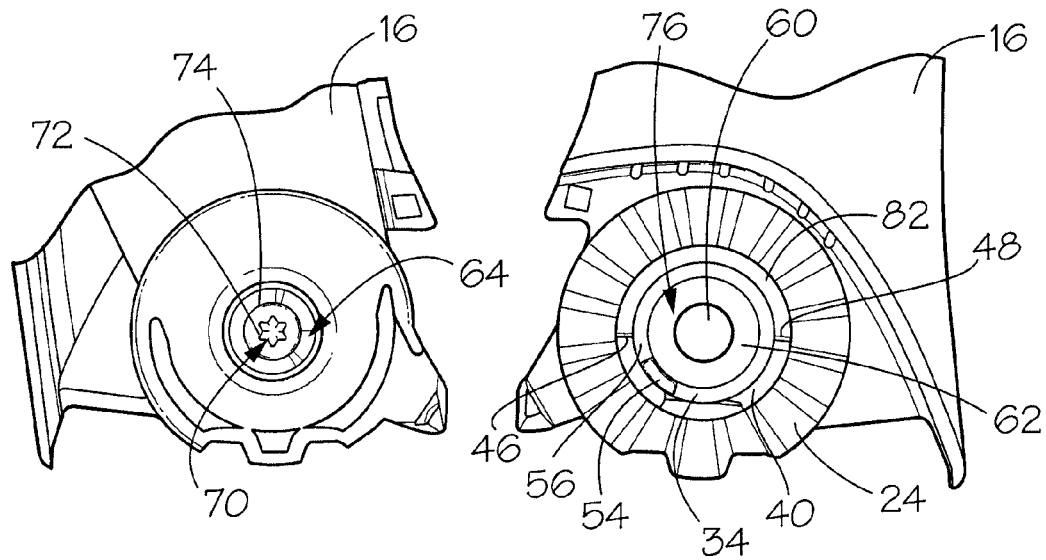
*Fig. 4*  *Fig. 5*
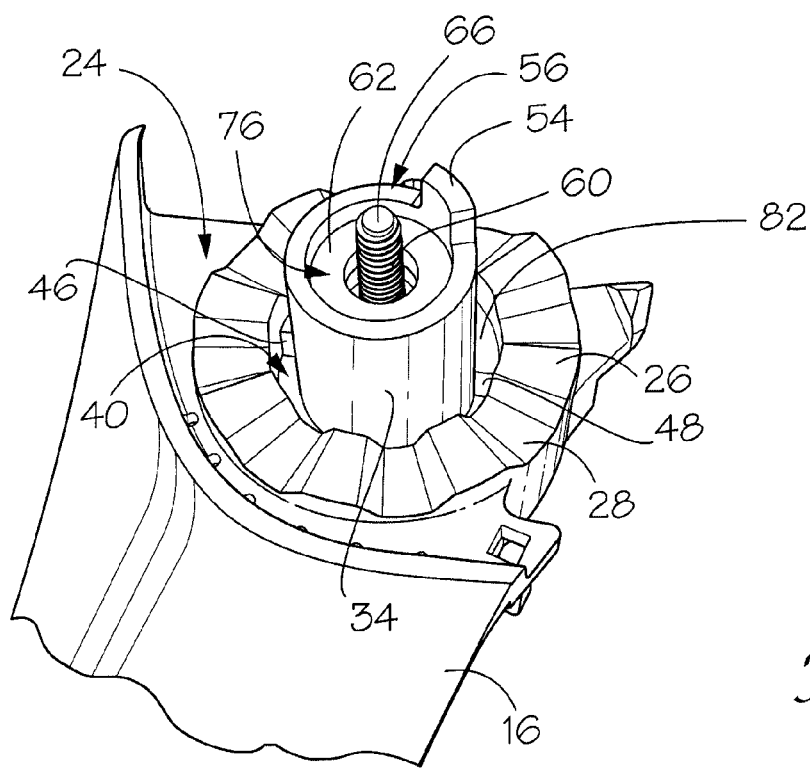
*Fig. 6*

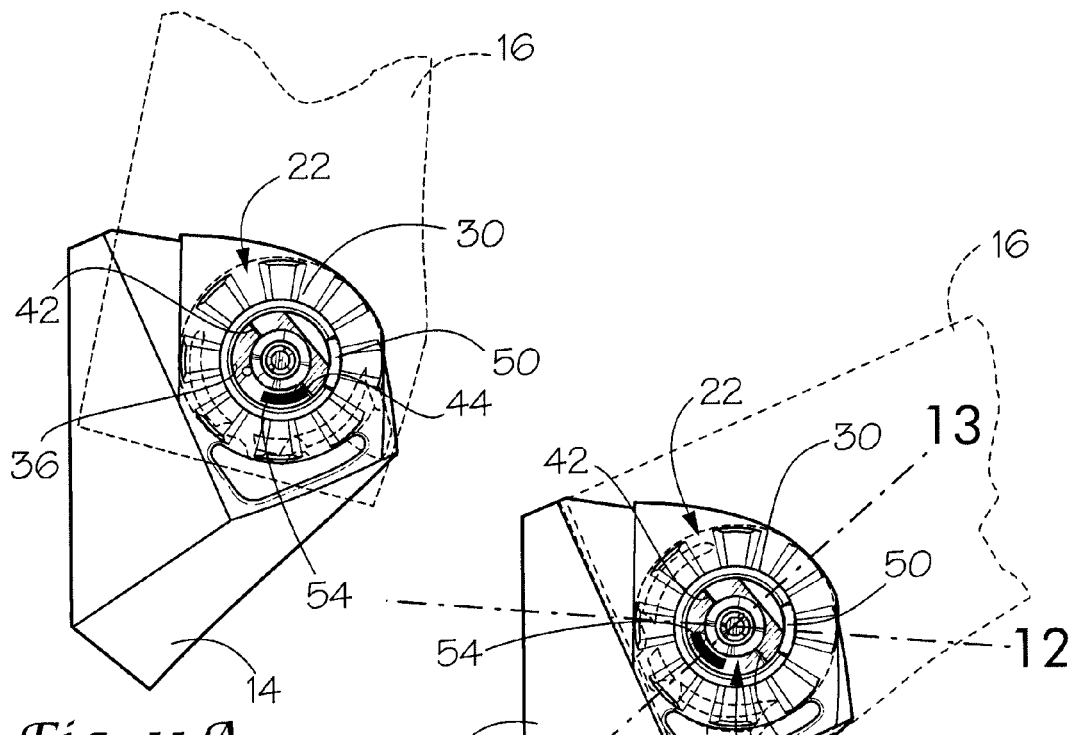
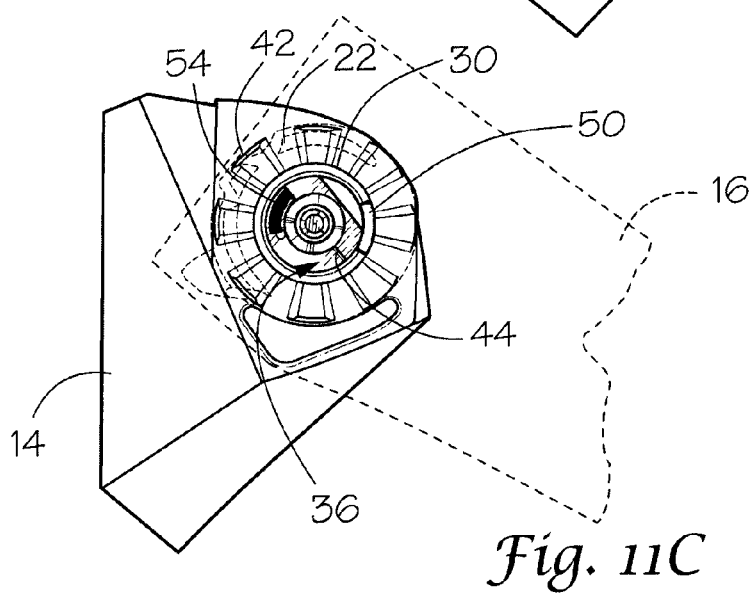
Fig. 11A
Fig. 11B
Fig. 11C

US 8,336,845 B1

PIVOTING DETENT JOINT FOR A VEHICLE MIRROR ASSEMBLY

BACKGROUND OF THE INVENTION

1) Field of the Invention

The present invention relates to exterior vehicle mirror assemblies, and more particularly, to a pivoting detent joint for large commercial vehicle mirror assemblies that includes a built-in stop mechanism to define a selected range of pivotal movement of the mirror head support arm on a carrier base.

2) Description of Related Art

Exterior vehicle mirror assemblies are known to include a pivoting detent joint connection between a carrier base attached to the vehicle and a support arm carrying the mirror head so that the mirror can be selectively positioned and held in a desired orientation. However, most of these mirror assemblies do not have any mechanism to restrict the pivotal movement of the support arm carrying the mirror head to a defined range. To prevent damage, it is desirable to provide a built-in stop mechanism to prevent unwanted rotation of the mirror assembly beyond defined or intended ranges of movement. In mirror assemblies without a built-in stop mechanism, the mirror head can be moved to a point of hitting the vehicle, or moved beyond the limit of the detent joint to hold the support arm in a functional position. Over rotation can damage the vehicle, the mirror assembly, or both.

Accordingly, it is an object of the present invention to provide a mirror assembly with a pivoting detent joint so that the operational position of the mirror head can be adjusted.

It is a further object of the present invention to provide a mirror assembly having a built-in stop mechanism to control the pivotal range of movement for a mirror head support arm.

SUMMARY OF THE INVENTION

The above objectives are accomplished according to the present invention by providing a pivoting detent joint for a vehicle mirror assembly comprising a carrier base for mounting to the vehicle; a support arm pivotally carried by the carrier base for supporting a mirror head; a base tooth ring included on the carrier base defining a first half of a detent connection; an arm tooth ring included on the support arm defining a second half of a detent connection, wherein the arm tooth ring engages the base tooth ring in interlocking cooperation for releasably holding the support arm in a position relative to the carrier base; a cylindrical base column included in the carrier base and disposed within the base tooth ring, wherein the base column defines a hollow interior chamber in the carrier base; a cylindrical arm column carried by the support arm and disposed within the arm tooth ring, wherein the arm column extends into the hollow interior chamber of the base column; a first stop block channel disposed in a bottom surface of the base column within the hollow interior chamber, and a second stop block channel disposed in the support arm within the arm tooth ring and adjacent an exterior side of the arm column; and, a first stop block carried by a distal end of the base column being received into the second stop block channel in the support arm, and a second stop block carried by a distal end of the arm column being received into the first stop block channel in the hollow interior chamber of the base column; wherein the first and second stop blocks travel through the first and second stop block channels, respectively, to define a range of pivotal movement of the support arm on the carrier base.

In a further embodiment, a guide post is disposed in the hollow interior chamber extending generally from the bottom surface through a post opening in a floor plate of the arm column and into an interior channel of the arm column. A connecting bolt is carried by the carrier base and extends through the guide post into the interior channel of the arm column. A coil spring is carried in the interior channel that engages a head portion of the connecting bolt and the floor plate of the arm column so that the spring biases against the head portion to draw the connecting bolt into the interior channel, whereby resistance is provided to maintain engagement between the base tooth ring and the arm tooth ring.

In a further embodiment, a floor plate is carried by the arm column that is recessed from the distal end of the arm column to define a bottom recess area receiving a guide ring projecting from the bottom surface of the base column for stabilizing the arm column in the base column during pivotal movement of the support arm.

In a further embodiment, the base column includes a collar portion protruding above the base tooth ring that is received into a collar recess of the support arm disposed within the arm tooth ring and adjacent the arm column for stabilizing the support arm on the carrier base.

In a further embodiment, the first stop block channel includes a first end wall spaced around an interior circumference of the base column from a second end wall to define the first stop block channel.

In a further embodiment, the second stop block channel includes a first end wall spaced around an exterior circumference of the arm column from a second end wall to define the second stop block channel.

In a further embodiment, a first drain opening is disposed in the bottom surface of the base column.

In a further embodiment, a second drain opening is disposed in the first stop block channel of the bottom surface.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 4 shows a top plan view of a portion of the support arm according to the present invention;

FIG. 5 shows a bottom plan view of a portion of the support arm according to the present invention;

FIG. 6 shows a bottom perspective view of a portion of the support arm according to the present invention;

FIGS. 11A-11C show a top plan cut-away view of the detent joint according to the present invention;

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims.

DETAILED DESCRIPTION OF A PREFERRED EMBODIMENT

Figure 1:
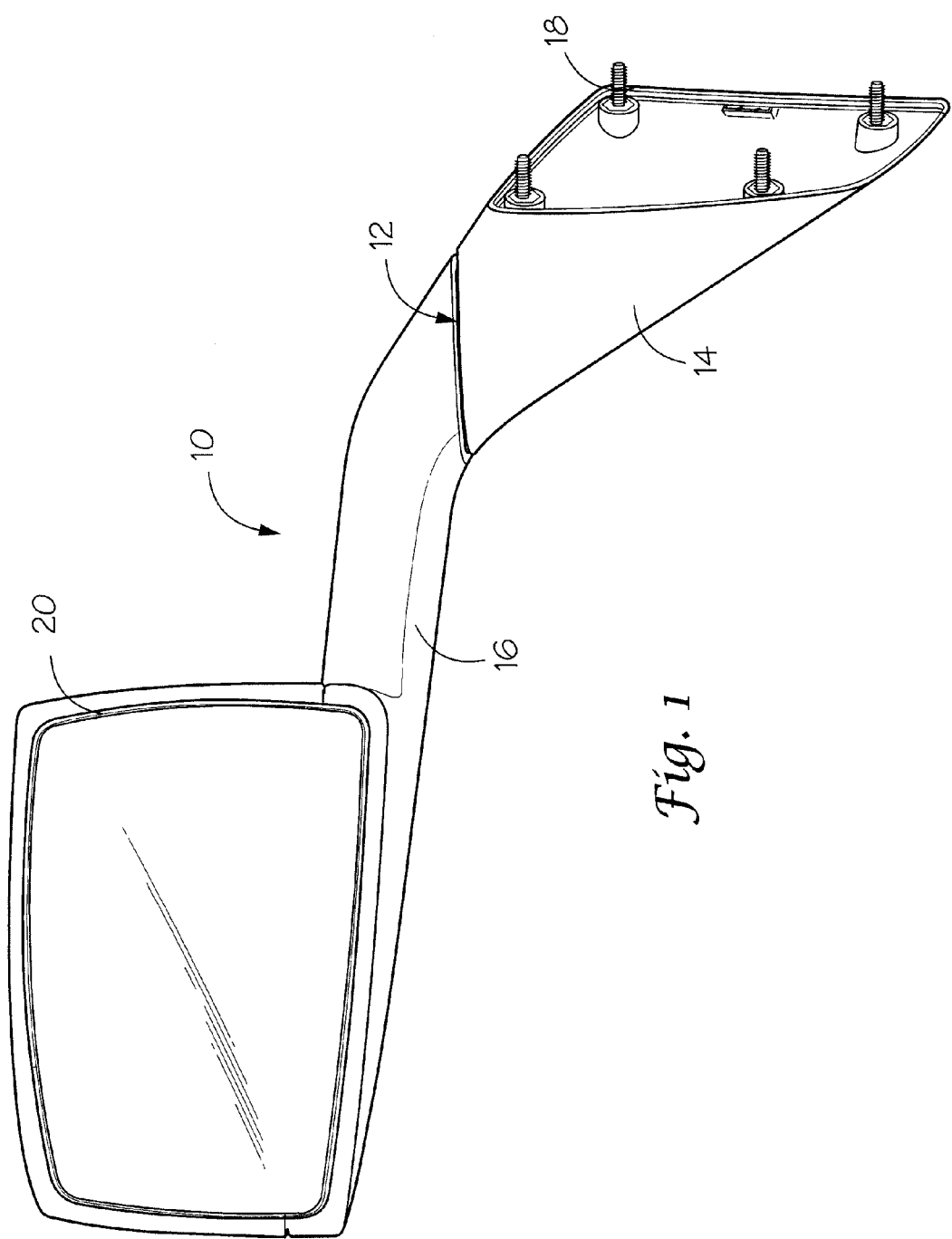
FIG. 1 shows a perspective view of a mirror assembly according to the present invention.

With reference to the drawings, the invention will now be described in more detail. Referring to FIG. 1, a vehicle mirror assembly, designated generally as 10, is shown which includes a pivoting detent joint, designated generally as 12, with built-in stops for controlling pivotal movement of the detent joint. In the illustrated embodiment, the mirror assembly includes a carrier base 14 for mounting to the vehicle. Typically, an arrangement of connecting screws 18, bolts, clips and the like are mounted in carrier base 14 for attaching to the vehicle body. A support arm 16 is pivotally carried by carrier base 14. Support arm 16 carries mirror head 20 which includes the mirror class for rearward vision around the vehicle.

Figure 2:
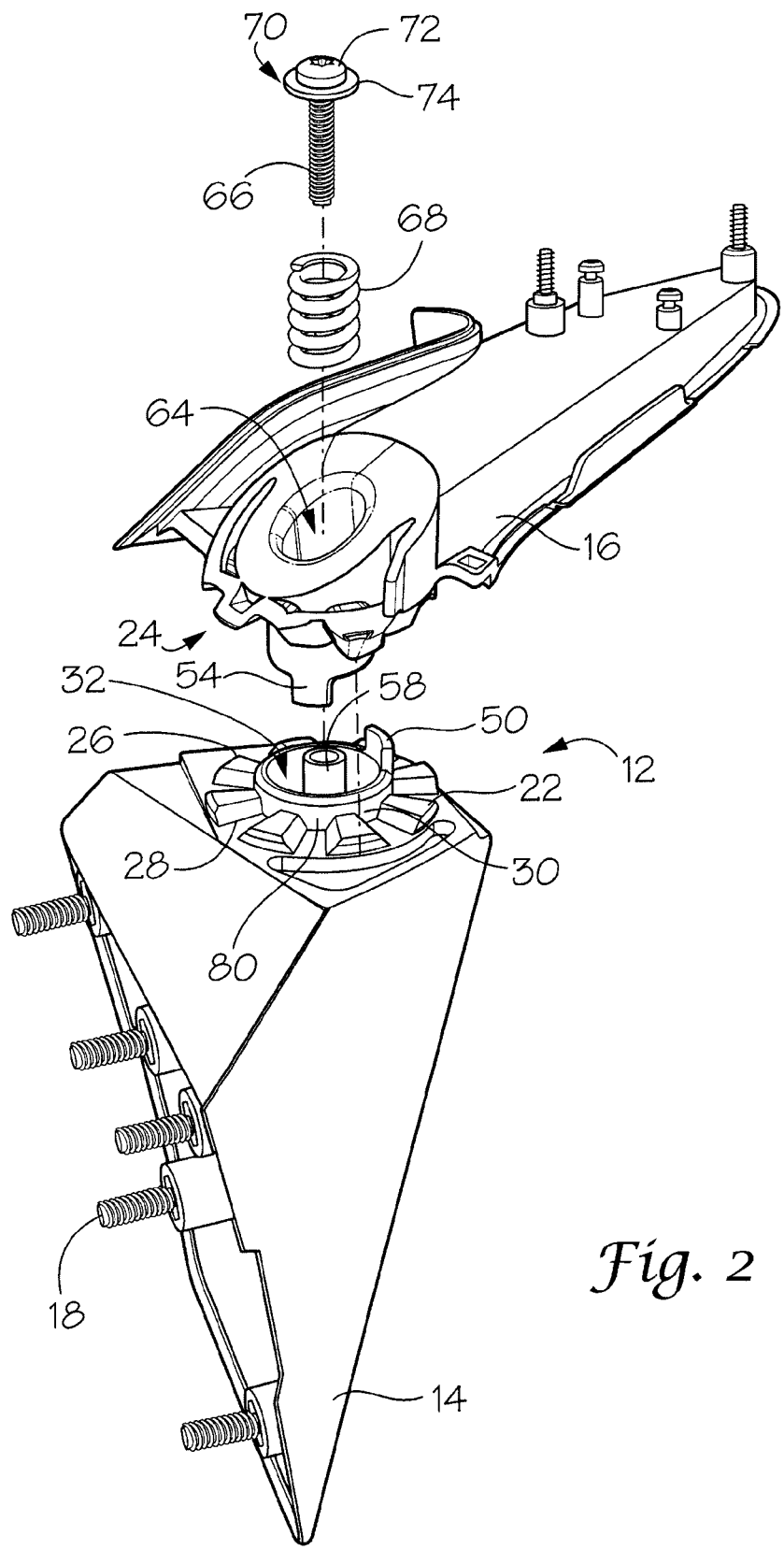
FIG. 2 shows an exploded perspective view of the detent joint according to the present invention.
Figure 3:
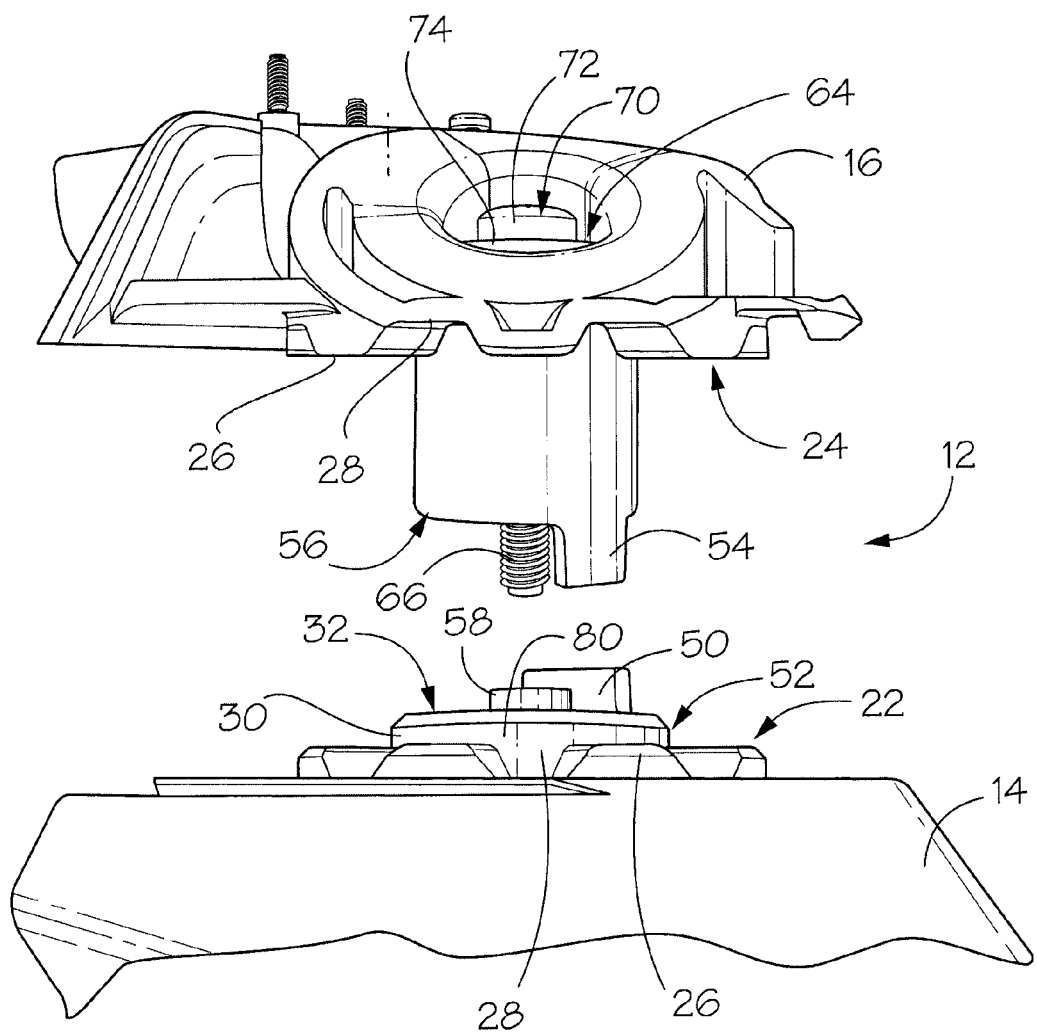
FIG. 3 shows an exploded side view of the detent joint according to the present invention.
Figure 7:
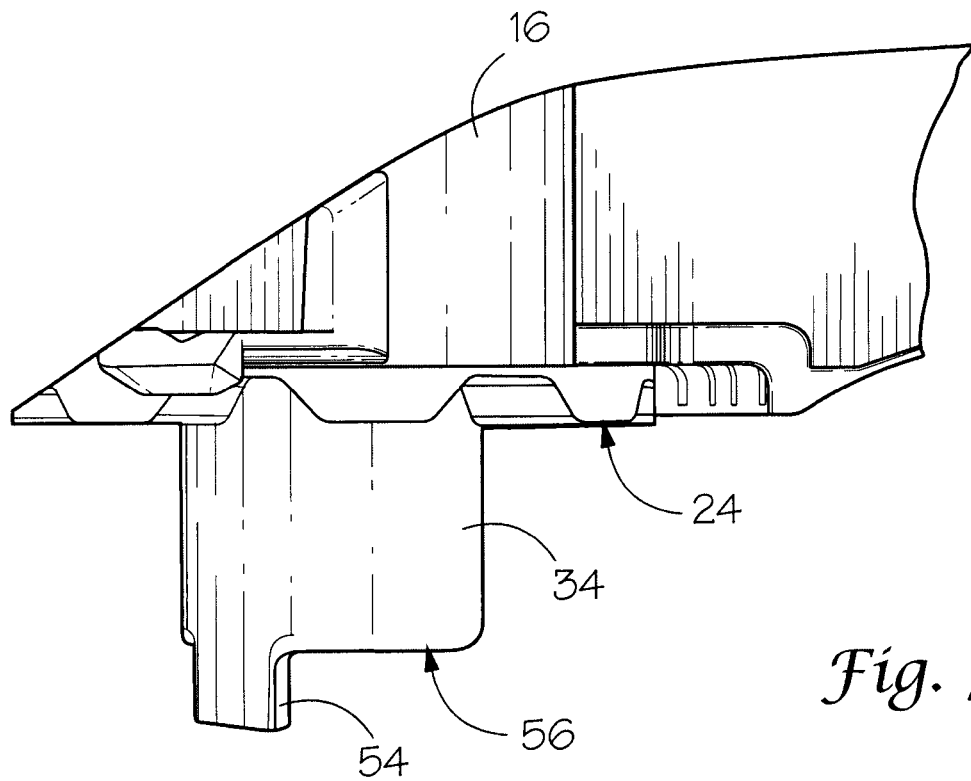
FIG. 7 shows a side view of a portion of the support arm according to the present invention.

Referring to FIGS. 2 and 3, detent joint 12 includes a base tooth ring, designated generally as 22, mounted on carrier base 14 defining a first half of a detent connection, and an arm tooth ring, designated generally as 24, included on support arm 16 defining a second half of the detent connection. Each tooth ring 22, 24 is defined by a series of grooves 26 and ridges 28 arranged in a circular formation. The arm tooth ring 24 engages base tooth ring 22 in interlocking cooperation for releasably holding support arm 16 in a position relative to carrier base 14. As described further herein below, by overcoming a spring bias the tooth rings 22, 24 can be disengaged to allow for pivotal movement of support arm 16.

Figure 8:
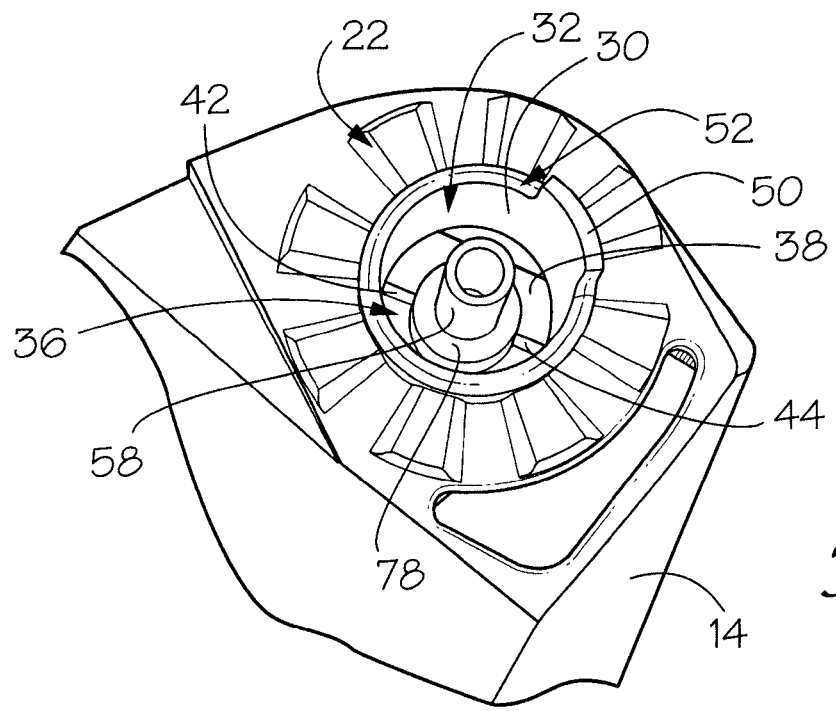
FIG. 8 shows a top perspective view of a portion of the carrier base according to the present invention.
Figure 9:
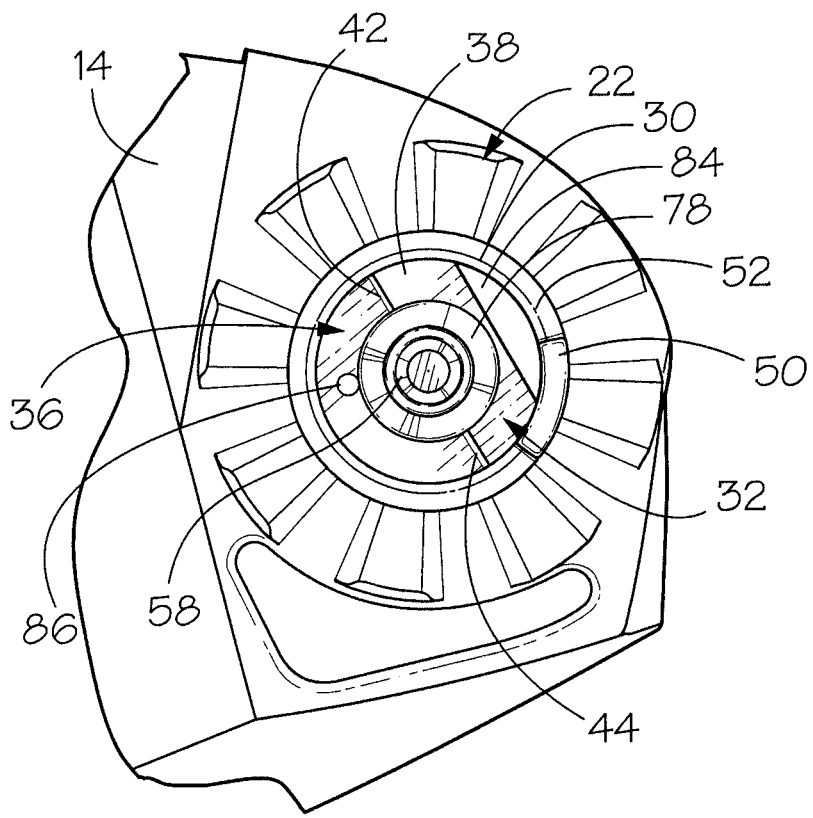
FIG. 9 shows a top plan view of a portion of the carrier base according to the present invention.
Figure 10:
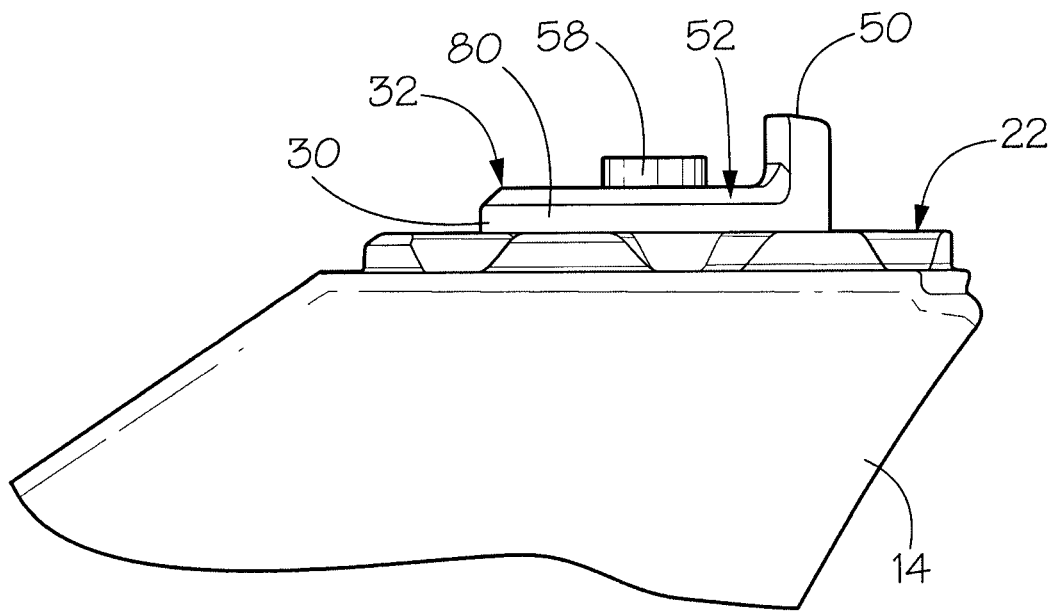
FIG. 10 shows a side view of a portion of the carrier base according to the present invention.

Referring to FIGS. 8-10, a cylindrical base column 30 is included in carrier base 14. Cylindrical base column 30 defines a hollow interior chamber, designated generally as 32, in carrier base 14. In the illustrated embodiment, cylindrical base column 30 is disposed within the circumference of base tooth ring 22 and extends into an interior of carrier base 14. While this is a preferred arrangement, particularly for compact mirror assemblies, it is contemplated that cylindrical base column 30 can be positioned outside of base tooth ring 22 for cooperating with elements from support arm 16.

Figure 12:
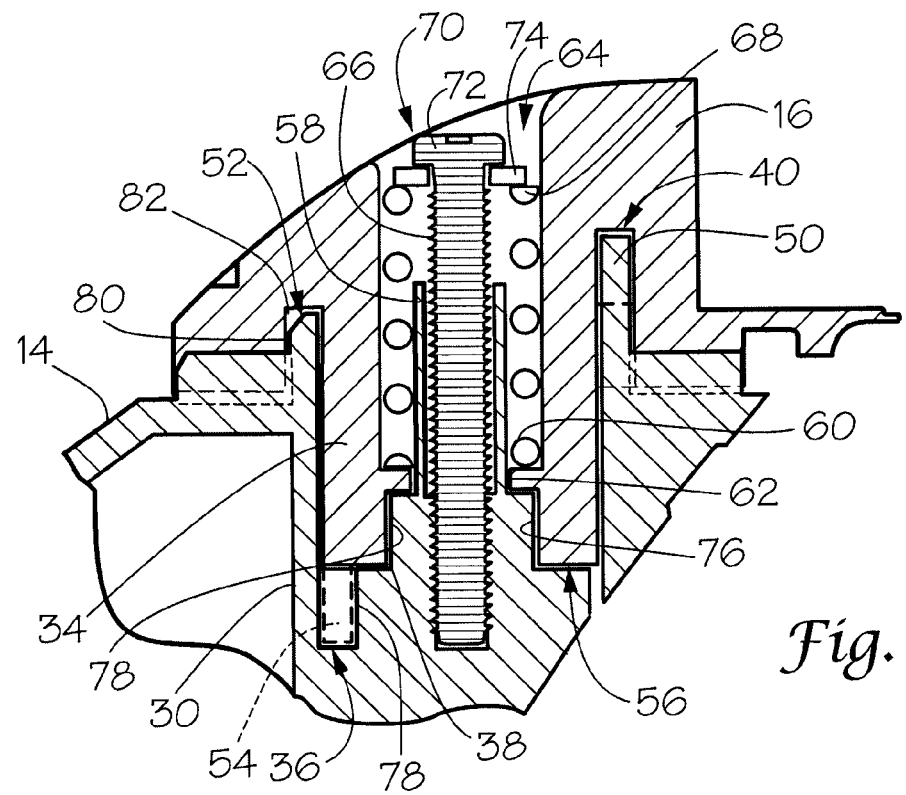
FIG. 12 shows a side cross-section view of the detent joint according to FIG. 11B; and, FIG. 13 shows a side cross-section view of the detent joint according to FIG. 11B.
Figure 13:
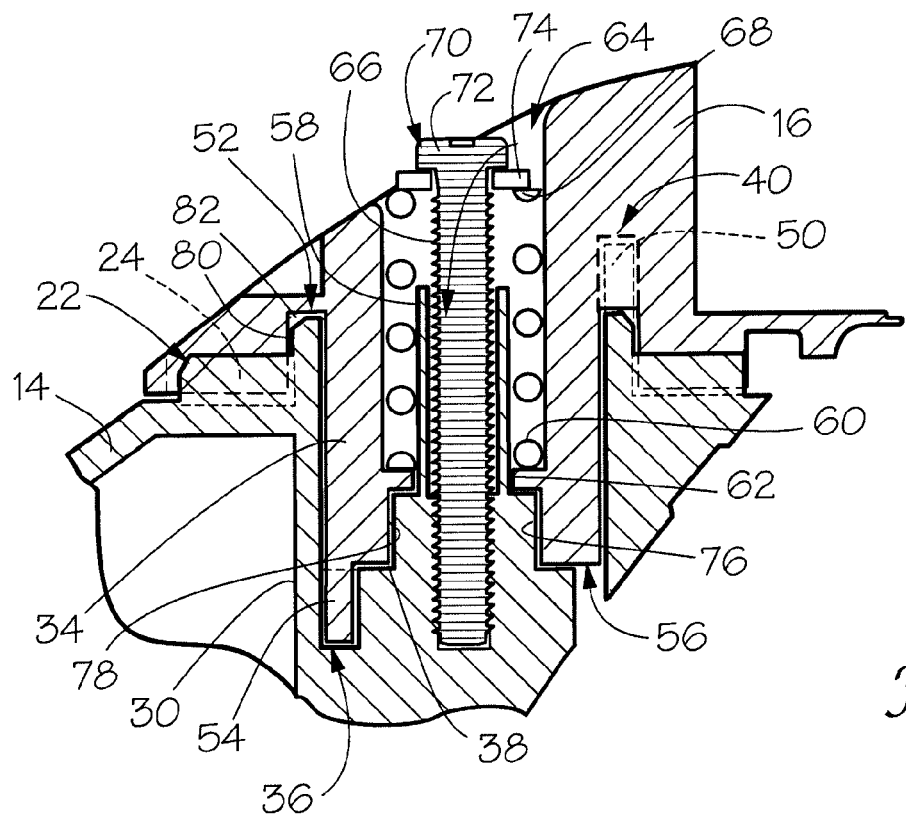

Referring to FIGS. 4-7, a cylindrical arm column 34 is carried by support arm 16 for cooperating with cylindrical base column 30 of carrier base 14. In the illustrated embodiment, cylindrical arm column 34 is disposed within the circumference of arm tooth ring 24. Referring to FIGS. 12 and 13, cylindrical arm column 34 extends into hollow interior chamber 32 of cylindrical base column 30 so that arm column 34 pivots within base column 30 when support arm 16 is rotated on carrier base 14.

Referring to FIGS. 8 and 9, the built-in stop mechanism includes a first stop block channel, designated generally as 36, disposed in a bottom surface 38 of base column 30 within hollow interior chamber 32. First stop block channel 36 includes a first end wall 42 spaced around an interior circumference of base column 30 from a second end wall 44 to define the length of first stop block channel 36. As illustrated, first stop block channel 36 appears as a recess in bottom surface 38 running along the interior circumference of base column 30 and extends generally around half of the interior circumference of base column 30. Referring to FIGS. 5 and 6, the built-in stop mechanism further includes a second stop block channel, designated generally as 40, disposed in a bottom side of support arm 16. Second stop block channel 40 includes a first end wall 46 spaced around an exterior circumference of arm column 34 from a second end wall 48 to define the length of second stop block channel 40. In the illustrated arrangement, second stop block channel 40 is disposed within arm tooth ring 24 and adjacent the exterior side of arm column 34. Stop block channel 40 extends generally around half of the exterior circumference of arm column 34.

Referring to FIGS. 8 and 9, the built-in stop mechanism also includes a first stop block 50 carried by a distal end, designated generally as 52, of base column 30. Referring to FIGS. 5 and 6, a second stop block 54 is carried by a distal end, designated generally as 56, of arm column 34. Referring to FIGS. 12 and 13, first stop block 50 is received into second stop block channel 40 in support arm 16, and second stop block 54 is received into first stop block channel 36 in hollow interior chamber 32 of base column 30.

Referring to FIGS. 11A-11C, first and second stop blocks 50 and 54 travel through first and second stop block channels 36 and 40, respectively, to define a range of pivotal movement of support arm 16 on carrier base 14. In FIG. 11B, second stop block 54 is shown positioned generally in the middle of first stop block channel 36, defining a home position in which support arm 16 is fully extended in an operation position for rearward viewing along the vehicle. In FIG. 11A, support arm 16 is pivoted backward and inwardly toward the vehicle to a first stop position wherein second stop block 54 carried by arm column 34 engages second end wall 44 in first stop block channel 36 to prevent further rotation of support arm 16. Reciprocally, in the first stop position of FIG. 11A, first stop block 50 carried by base column 30 engages second end wall 48. In FIG. 11C, support arm 16 is pivoted forward and inwardly toward the vehicle to a second stop position wherein second stop block 54 carried by arm column 34 engages first end wall 42 in first stop block channel 36 to prevent further rotation of support arm 16. Reciprocally, in the second stop position of FIG. 11C, first stop block 50 carried by base column 30 engages first end wall 46. Accordingly, stop blocks 50 and 54 cooperate to simultaneously engage the respective end wall in the respective stop block channels 36 and 40 to prevent further rotation of support arm 16 whether in the first stop position or the second stop position. The length of stop block channels 36 and 40 determines the range of rotation for support arm 16. Stop block channels 36 and 40 correspond in length so that the stop blocks 50 and 54 engage the respective end wall of each stop block channel 36 and 40 simultaneously for the given stop position.

Referring to FIGS. 8 and 9, in the illustrated embodiment, a guide post 58 is disposed in hollow interior chamber 32 extending generally from bottom surface 38. Referring to FIGS. 5, 12 and 13, guide post 58 extends through a post opening 60 in a floor plate 62 of arm column 34 and into an interior channel, designated generally as 64, of arm column 34.

Referring to FIGS. 2, 12 and 13, a connecting bolt 66 is carried by carrier base 14 that extends through guide post 58 into interior channel 64 of arm column 34. In the illustrated embodiment, connecting bolt 66 screws into carrier base 14 to securely affix connecting bolt 66 to carrier base 14. A coil spring 68 is carried in interior channel 64 of arm column 34 which engages a head portion, designated generally as 70, of connecting bolt 66 and floor plate 62 of arm column 34. In the preferred embodiment, head portion 70 includes the bolt head 72 and washer 74 to provide an engaging surface for coil spring 68. Coil spring 68 biases against head portion 70 and floor plate 62 to draw connecting bolt 66 into interior channel 64 of arm column 34 so that resistance is provided to maintain engagement between base tooth ring 22 and arm tooth ring 24.

Referring to FIG. 6, in a preferred embodiment, floor plate 62 carried by arm column 34 is recessed from distal end 56 of arm column 34 to define a bottom recess area, designated generally as 76. Referring to FIGS. 8, 12 and 13, a guide ring 78 projects generally from bottom surface 38 of base column 30 and is received into bottom recess area 76 for stabilizing arm column 34 in base column 30 during pivotal movement of support arm 16.

Referring to FIGS. 10, 12 and 13, in a preferred embodiment, base column 30 includes a collar portion 80 protruding above base tooth ring 22. With further reference to FIGS. 5 and 6, collar portion 80 is received into a collar recess 82 of support arm 16 which is disposed within arm tooth ring 34 for stabilizing support arm 16 on carrier base 14. In the illustrated embodiment, collar recess 82 is disposed adjacent arm column 34 and extends around the exterior circumference of arm column 34.

Referring to FIG. 9, a first drain opening 84 is disposed in bottom surface 38 of base column 30 for draining liquid from the mirror assembly detent joint. Additionally, a second drain opening 86 is disposed in first stop block channel 36 of bottom surface 38 for draining liquid from the mirror assembly detent joint.

While a preferred embodiment of the invention has been described using specific terms, such description is for illustrative purposes only, and it is to be understood that changes and variations may be made without departing from the spirit or scope of the following claims.

What is claimed is:

1. A pivoting detent joint for a vehicle mirror assembly comprising:
   a carrier base for mounting to the vehicle;
   a support arm pivotally carried by said carrier base for supporting a mirror head;
   a base tooth ring included on said carrier base defining a first half of a detent connection;
   an arm tooth ring included on said support arm defining a second half of the detent connection, wherein said arm tooth ring engages said base tooth ring in interlocking cooperation;
   a cylindrical base column included in said carrier base and disposed within said base tooth ring, wherein said base column defines a hollow interior chamber in said carrier base;
   a cylindrical arm column carried by said support arm and disposed within said arm tooth ring, wherein said arm column extends into said hollow interior chamber of said base column;
   a first stop block channel disposed in a bottom surface of said base column within said hollow interior chamber, and a second stop block channel disposed in said support arm within said arm tooth ring and adjacent an exterior side of said arm column; and,
   a first stop block carried by a distal end of said base column being received into said second stop block channel in said support arm, and a second stop block carried by a distal end of said arm column being received into said first stop block channel in said hollow interior chamber of said base column;
   wherein said first and second stop blocks travel through said first and second stop block channels, respectively, to define a range of pivotal movement of said support arm on said carrier base.

2. The detent joint of claim 1 including a guide post disposed in said hollow interior chamber extending generally from said bottom surface through a post opening in a floor plate of said arm column and into an interior channel of said arm column.

3. The detent joint of claim 2 including a connecting bolt carried by said carrier base extending through said guide post into said interior channel of said arm column.

4. The detent joint of claim 3 including a coil spring carried in said interior channel engaging a head portion of said connecting bolt and said floor plate of said arm column so that said spring biases against said head portion to draw said connecting bolt into said interior channel, whereby resistance is provided to maintain engagement between said base tooth ring and said arm tooth ring.

5. The detent joint of claim 1 including a floor plate carried by said arm column being recessed from said distal end of said arm column to define a bottom recess area receiving a guide ring projecting from said bottom surface of said base column for stabilizing said arm column in said base column during pivotal movement of said support arm.

6. The detent joint of claim 1 wherein said base column includes a collar portion protruding above said base tooth ring and being received into a collar recess of said support arm disposed within said arm tooth ring and adjacent said arm column for stabilizing said support arm on said carrier base.

7. The detent joint of claim 1 wherein said first stop block channel includes a first end wall spaced around an interior circumference of said base column from a second end wall to define said first stop block channel.

8. The detent joint of claim 1 wherein said second stop block channel includes a first end wall spaced around an exterior circumference of said arm column from a second end wall to define said second stop block channel.

9. The detent joint of claim 1 including a first drain opening disposed in said bottom surface of said base column.

10. The detent joint of claim 1 including a second drain opening disposed in said first stop block channel of said bottom surface.

11. A pivoting detent joint for a vehicle mirror assembly comprising:
   a carrier base for mounting to the vehicle;
   a support arm pivotally carried by said carrier base for supporting a mirror head;
   a base tooth ring included on said carrier base and an arm tooth ring included on said support arm, wherein said arm tooth ring engages said base tooth ring in interlocking cooperation;
   a base column having a hollow interior chamber carried by said carrier base;
   an arm column carried by said support arm extending into said hollow interior chamber of said base column;

a stop block channel disposed in a bottom surface of said base column within said hollow interior chamber, wherein said stop block channel includes a first end wall spaced around an interior circumference of said base column from a second end wall to define said stop block channel; and, a stop block carried by a distal end of said arm column being received into said stop block channel in said hollow interior chamber of said base column;

wherein said stop block travels through said stop block channel to define a range of pivotal movement of said support arm on said carrier base.

12. The detent joint of claim 11 including a guide post disposed in said hollow interior chamber extending generally from said bottom surface through a post opening in a floor plate of said arm column and into an interior channel of said arm column.

13. The detent joint of claim 12 including a connecting bolt carried by said carrier base extending through said guide post into said interior channel of said arm column.

14. The detent joint of claim 13 including a coil spring carried in said interior channel engaging a head portion of said connecting bolt and said floor plate of said arm column so that said spring biases against said head portion to draw said connecting bolt into said interior channel, whereby resistance is provided to maintain engagement between said base tooth ring and said arm tooth ring.

15. A pivoting detent joint for a vehicle mirror assembly comprising:

a support arm pivotally carried by a carrier base for supporting a mirror head on a vehicle exterior;

a base tooth ring included on said carrier base and an arm tooth ring included on said support arm, wherein said arm tooth ring engages said base tooth ring in interlocking cooperation;

a base column included in said carrier base and disposed within said base tooth ring, wherein said base column defines a hollow interior chamber in said carrier base;

an arm column carried by said support arm and disposed within said arm tooth ring, wherein said arm column extends into said hollow interior chamber of said base column;

a collar portion included in said base column protruding above said base tooth ring and being received into a collar recess of said support arm disposed within said arm tooth ring and adjacent said arm column for stabilizing said support arm on said carrier base;

a stop block channel disposed in said support arm within said arm tooth ring and adjacent an exterior side of said arm column; and, a stop block carried by a distal end of said base column being received into said stop block channel in said support arm;

wherein said stop block travels through said stop block channel to define a range of pivotal movement of said support arm on said carrier base.

16. The detent joint of claim 15 including a floor plate carried by said arm column being recessed from a distal end of said arm column to define a bottom recess area receiving a guide ring projecting from a bottom surface of said base column for stabilizing said arm column in said base column during pivotal movement of said support arm.

17. The detent joint of claim 15 wherein said stop block channel includes a first end wall spaced around an exterior circumference of said arm column from a second end wall to define said stop block channel.

\* \* \* \* \*